May 5, 1925.
T. W. SUDDARD
ROLLER
Filed Jan. 30, 1923
1,536,162
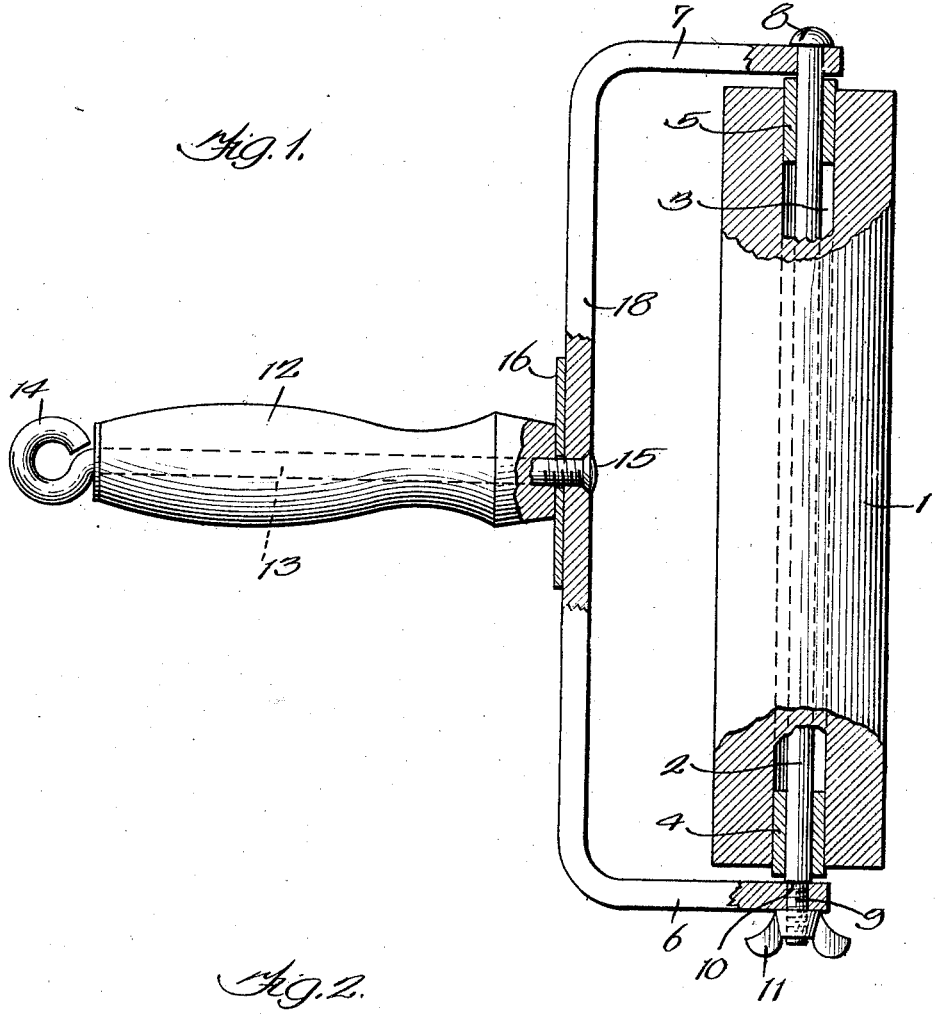
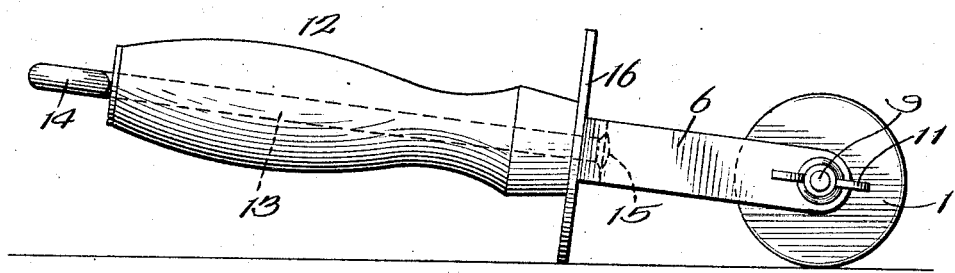
Inventor:
Thomas W. Suddard Patented May 5, 1925.

1,536,162

UNITED STATES PATENT OFFICE.

THOMAS W. SUDDARD, OF TWO RIVERS, WISCONSIN, ASSIGNOR TO THE HAMILTON MANUFACTURING COMPANY, OF TWO RIVERS, WISCONSIN, A CORPORATION OF WISCONSIN.

ROLLER.

Application filed January 30, 1923. Serial No. 615,810.

*To all whom it may concern:*

Be it known that I, THOMAS W. SUDDARD, citizen of the United States, residing at Two Rivers, in the county of Manitowoc and State of Wisconsin, have invented a certain new and useful Improvement in Rollers, of which the following is a full, clear, concise, and exact description.

My invention relates to rollers and is of particular service when embodied in an inking roller, though the invention is not to be limited to any particular use or adaptation thereof.

The roller of my present invention is, in its preferred embodiment, an improvement upon the roller forming the subject matter of my co-pending application Serial No. 583,712, filed August 23, 1922.

The roller and its various characteristics will be fully explained by reference to the accompanying drawing in which Fig. 1 is a plan view, with parts broken away, showing the preferred embodiment thereof; and Fig. 2 is a side view thereof.

Like parts are indicated by similar characters of reference throughout both figures.

The roller illustrated includes a revoluble member 1 that may be of any suitable shape. When embodied in an inking roller the member 1 is cylindrical and is formed of material, such as wood, which adapted to spread ink upon a plate or to take it up from the plate preparatory to its transfer to a printing form. This roller is revolubly supported upon a shaft 2 which is passed through the bore 3 of the roller which is preferably larger than the shaft and which contains two sleeve bearings 4 and 5 that are tightly fitted within the ends of the roller. The bearing sleeves turn upon the shaft as the roller is turned by contact with the surface over which it is being rolled. The shaft passes through the sides 6 and 7 of a bail 8 which is desirably continuous or integral from end to end thereof. The shaft is in the form of a bolt passing through the sides of the bail and through the roller, said shaft having a head 8 upon one end and being threaded upon the other end 9 and having a shoulder 10 at said threaded end engaging the adjacent side 6 of the bail to limit the extent to which the bail sides may be drawn toward each other always to allow the roller to be free to turn. A nut 11, preferably a wing nut, is screwed upon the outer end of the threaded portion of the bolt that projects through the adjacent bail side.

The bail is preferably provided with a handle 12 having a bore extending longitudinally therethrough. This handle is assembled with the mid portion of the bail by means of a bolt 13 which extends through the handle and has fixed enlargements 14 and 15 that are integrally formed with the bolt and which serve to prevent the withdrawal of the bolt in either direction. The enlargement 14 is desirably in the form of an eye so that the roller may be supported from a nail or a hook if so desired. The inner end of the bolt 15 is desirably threaded and is screwed into the head portion of the bail, the enlargement 15 being formed by riveting the inner end of the bolt as illustrated. A washer 16 may be interposed between the handle and the bail to support the handle and bail from the object upon which the roller rests, as indicated in Fig. 2, the washer extending a sufficient distance laterally of the bail for this purpose.

While I have herein shown and particularly described the preferred embodiment of my invention, I do not wish to be limited to the precise details of construction shown as changes may readily be made without departing from the spirit of my invention, but having thus described my invention I claim as new and desire to secure by Letters Patent the following:—

1. A roller including a revoluble member; a bail upon and between the sides of which said revoluble member is mounted to turn; a handle; and a bolt passing lengthwise through the handle, the outer end of the bolt projecting through the outer end of the handle and the inner end of the bolt projecting through the bail, both ends of the bolt having fixed enlargements integrally formed therewith to prevent the withdrawal of the bolt through the handle in either direction, the enlargement at the outer end of the bolt being in the form of an eye.

2. A roller including a revoluble member; a bail between the sides of which said revoluble member is mounted to turn; and a handle that is inclusive of a bolt threaded into the mid portion of the bail, the inner end of this bolt being of rivet formation to secure the assembly of the bolt and bail.

In witness whereof, I hereunto subscribe my name this 26th day of January, A. D. 1923.

THOMAS W. SUDDARD.